Oct. 1, 1946.  O. A. KEHLE  2,408,562
FLOW CONTROL VALVE
Filed May 28, 1943
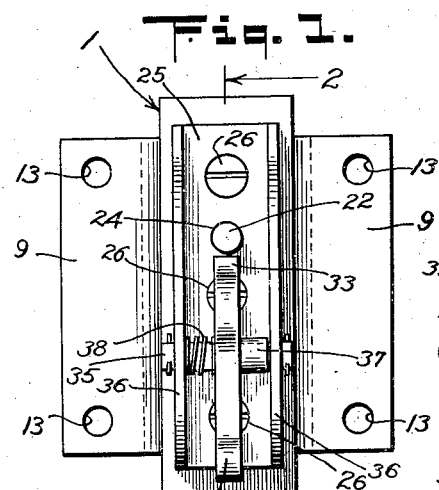
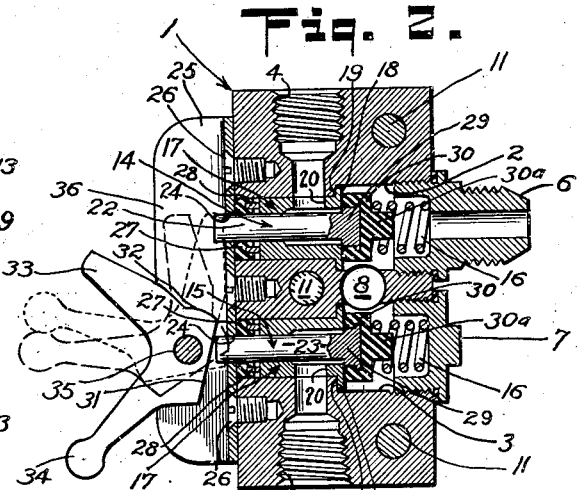
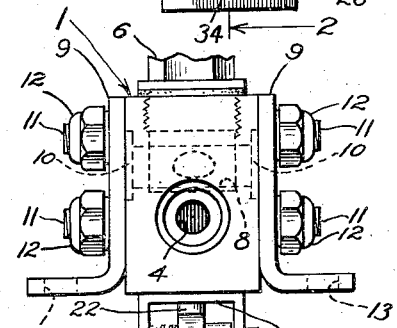
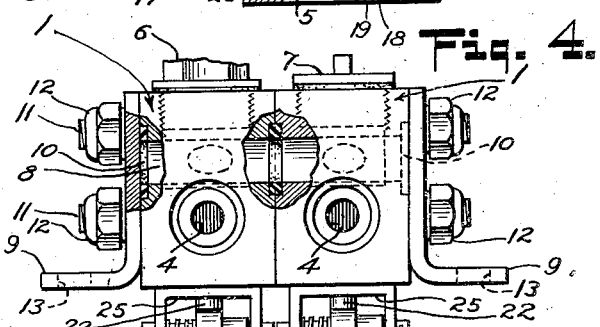
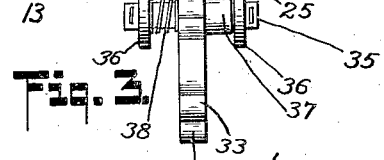
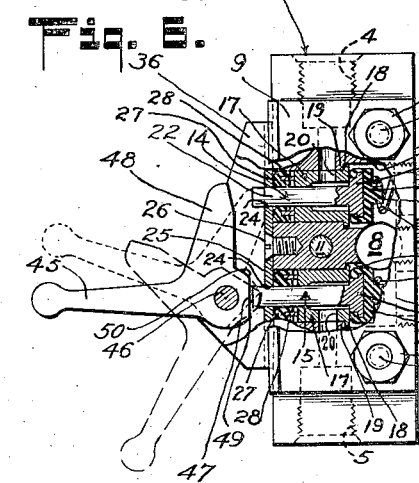
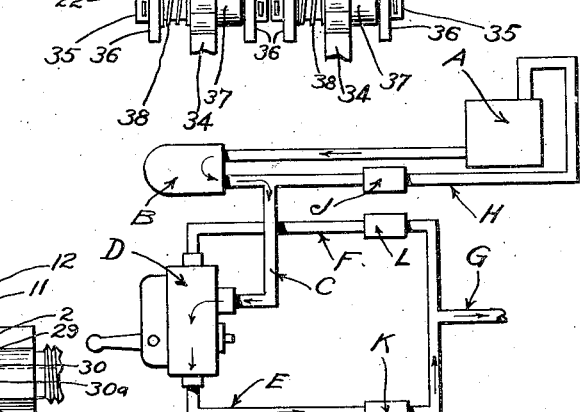
Inventor
OTTMAR A. KEHLE
By R. S. Berry
Attorney Patented Oct. 1, 1946

2,408,562

UNITED STATES PATENT OFFICE 2,408,562

FLOW CONTROL VALVE

Ottmar A. Kehle, West Los Angeles, Calif., assignor to Adel Precision Products Corp., a corporation of California Application May 28, 1943, Serial No. 488,923

3 Claims. (Cl. 277—20)

This invention relates to valves for controlling the rate of flow of fluid from a pump or other source of supply under pressure to a point of application or use of the fluid.

An object of my invention is to provide a flow control valve unit such as described which is comparatively small, compact, light as to weight, simple as to construction and most reliable as to operation for effecting the flow of anti-icing fluid at variable rates for application to those parts of an aircraft where ice is likely to form, or on which parts ice has formed and may be removed upon application of the fluid thereto; said valve unit being of course applicable to hydraulic and other systems where similar flow control is desired.

Another object of my invention is to provide a valve unit such as described wherein a novel arrangement of valve members and an especially designed operating means make it possible to effect a ready and most reliable control of the flow of variable amounts of fluid at the will of the operator with provision for setting the operating means to cause a uniform normal flow from the valve unit, say at a rate of four gallons or less per hour for preventing the formation of ice on the serviced part or parts, or quickly manipulating the operating means to cause a greatly increased emergency flow should the occasion so demand, say double the normal rate of flow, the operating means when released from the emergency flow position automatically returning to said normal flow position in one embodiment of my invention and to the off or neutral position in another embodiment of my invention.

Another object of my invention is to provide a valve unit of the character described having two outlets each controlled by a valve and an operating means common to the valves and including a single handle movable from a neutral position into normal flow position to cause but one valve to open, and into an emergency flow position in which both valves will be held open until the handle is released whereupon in one form of my invention the handle will return to the normal flow position, and in another form of my invention will return to the neutral position.

A further object of my invention is to provide a control valve unit such as described in which a novel construction and arrangement of a valve body member and ports and valve members therein makes it possible to readily couple together or "stack" in an efficacious manner a plurality of such units for independent operation with one of the units receiving the pressure fluid from the pump and supplying the fluid to each of the other units, thereby eliminating a separate fluid supply line for each unit.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a front elevation of a control valve unit embodying my invention;

Fig. 2 is a vertical sectional view taken on the line 2—2 of Fig. 1;

Fig. 3 is a top plan view of the valve unit shown in Figs. 1 and 2;

Fig. 4 is a fragmentary top plan view of two of my valve units coupled together in accordance with this invention;

Fig. 5 is a diagrammatic view showing the application of my valve unit to an aircraft anti-icing system.

Fig. 6 is a fragmentary side elevation, partly in section, of a modified form of control valve unit embodying my invention.

Referring to the drawing more specifically, particularly Figs. 1 to 3 inclusive, it is seen that one form of my flow control valve unit includes a rectangular body member 1 having spaced parallel valve receiving bores 2 and 3 extending transversely therethrough and provided with outlet ports 4 and 5 extending longitudinally of the body member from points intermediate the ends of the respective bores to opposite ends of the body member.

As here provided the bore 2 has a fluid intake connection 6 screwed into one end thereof through which fluid under pressure is delivered to said bore whereas the corresponding end of the bore 3 is closed by a screw plug 7. Fluid thus delivered to the bore 2 passes through an intercommunicating port 8 into the bore 3 whereby the one intake connection supplies both valve bores with fluid under pressure. The intercommunicating port 8 is extended transversely through the body member 1 at right angles to the bores 2 and 3 but is so positioned that it bridges the space between and thereby connects said bores, the ends of this port being closed and sealed by means of portions of angular brackets 9 and sealing rings 10. These brackets are removably secured to the body member 1 by means of bolts 11 and nuts 12 and are provided with bolt holes 13 affording the mounting thereof on a suitable support (not shown). This arrangement of the port 8 and the brackets 9 makes possible a ready and efficacious coupling or stacking of two or more valve units as shown in Fig. 4 and as will be hereinafter more fully described.

Valves 14 and 15 have stems of uniform diameter mounted in the bores 2 and 3 for controlling the flow of fluid from said bores into the outlet ports 4 and 5. These valves are urged by springs 16 to seat against the inner ends of tubular valve seat member 17 snugly fitted in the bores 2 and 3 and having marginal flanges 18 abutting annular shoulders 19 in said bores. Ports 20 are provided in the seat members 17 to afford communication of the diametrically enlarged inner portions of the bores of said seat members with the outlet ports 4 and 5 respectively.

Stems 22 and 23 for the valve members 14 and 15 respectively, extend through the seat members 17 and openings 24 in a plate 25 secured by screws 26 to one side of the body member 1. This plate closes the adjacent ends of the bores 2 and 3. Expansible sealing rings 27 surround the valve stems between the outer ends of the seat members 17 and the plate 25 there being crowding rings 28 between the seat members and said sealing rings.

Each of the valves 14 and 15 as here shown comprises a flanged head 29 formed integrally with and being of larger diameter than its stem, and a cup-like valve member 30 of yieldable material such as rubber or synthetic rubber which encompasses said head so as to present an annular supplementary seal against the associated seat member 17 while surrounding the head 29 which also engages the seat member. The head 29 fits snugly in the socket afforded by the member 30 and securely holds said member on the head. A boss 30a on the member 30 acts as keeper for the associated spring 16.

In accordance with this invention the outer ends of the valve stems 22 and 23 project beyond the plate 25 so that they may be engaged by valve operating means including cam surfaces 31 and 32 and a crank arm 33. These cam surfaces and the crank arm are provided on the inner end of a handle 34 pivoted on a pin 35 carried by flanges 36 on the plate 25. The handle 34 is held in proper position on the pin 35 by means of a spacer sleeve 37 and a spring 38 as shown in Figs. 1 and 3, said spring holding the parts against rattling.

In its neutral or off position the handle 34 extends downwardly and outwardly from the pivot end 35 as shown in full lines in Fig. 2, and the cam surface 31 which is planar, is disposed at an angle to the outer end of the stem 23 of the valve 15 and close thereto while the crank arm 33 is spaced well outwardly from the valve stem 22 of the valve 14, both said valves being then closed.

In order to set the valve unit for a normal flow of anti-icing fluid, the handle 34 is lifted so that the cam surface 31 engages the stem 23 and moves it to unseat the valve 15. When the corner of the cam surface farthest from the handle 34 becomes approximately centered on the end of the stem 23, the handle and cam means will be held in position in which the valve 15 is unseated and so remains until the handle is moved into emergency flow position or back to neutral position. When the valve 15 is open the pressure fluid will flow from the bore 2 through the port 8 into the bore 3 past the open valve 15 and out through the outlet port 5, the valve 14 remaining seated.

When the handle is lifted into emergency flow position the convex cam surface 32 rides against the end of the stem 23 and opens the valve 15 maintaining it open while the crank arm 33 engages the stem 22 and opens the valve 14. Both valves are now open and fluid will flow through the bores 2 and 3 and out through the two outlet ports 4 and 5 thereby delivering a greater amount of fluid for an emergency servicing of parts or part to be de-iced. The emergency operation requires that the operator hold the handle in its uppermost or emergency flow position as shown in dotted lines in Fig. 2 and upon release of the handle the spring for the valve 14 will push the handle back to normal flow position thereby moving the cam 32 off the stem 23 and disposing the cam 31 in position to hold the valve 15 open while the valve 14 is closed.

A feature important in this valve unit is that the intercommunicating port 8 serves the purpose of connecting the bores 2 and 3 with one another and facilitates the coupling or stacking of two or more units together in an efficient manner as shown in Fig. 4. To do this the angular brackets 9 on the valve units are removed and the units then placed side by side with their ports 8 in registration. Two of the plates 9 are then put back on the outer sides of the units to cover the outer ends of the connected ports 8, and longer bolts are inserted through the body members, the bolt holes thereof being also aligned, and the two units are thus coupled for independent operation except that the supply of pressure fluid passes from one to the other of the units through the connecting ports 8 and but one supply line connected to one of the units need be used. With the plurality of valve units thus stacked, different portions of the aircraft may be serviced at will and the units are compactly mounted and take up but little room, it being unnecessary to run more than two fluid lines from each unit except the one to which the fluid supply line is connected. Furthermore, a distinct advantage results from the use of the particular type of intercommunicating ports 8 in a series of valve bodies stacked as aforesaid, because the aligned ports 8 provide a straight unobstructed passage through the intermediate units of the series. This advantage results from the fact that only opposite side portions of said port 8 communicate with the passages to which they deliver the incoming fluid.

Fig. 5 shows a diagram of a typical anti-icing system as used in aircraft as when operating to supply a normal flow of fluid, and which includes a reservoir A, and a pump B for delivering fluid through a supply line C to a control valve unit D embodying my invention. Line E leads from the normal flow outlet port 5 of the unit D and line F leads from the emergency outlet port 4 of said unit and said lines have a common outlet G where it is desired to apply the fluid. A relief line H leads from the supply line C back to the reservoir and is provided with a relief check valve J allowing excess fluid to flow back to the reservoir. In the lines E and F are metering or restrictor valves K and L set to allow fluid to flow through said lines at predetermined rates, the valve K being, for example, set to allow a flow of one gallon per hour or less and the valve L a flow of from eight to twelve gallons per hour. These valves are set to allow the requisite amount of fluid to be applied depending upon the size and other characteristics of the part of the plane to be serviced. When the two valves of the unit are opened maximum flow takes place to the part or parts being serviced but ordinarily a lesser flow is normally applied by opening but one of the two valves of the unit as hereinbefore described.

A modified form of my invention shown in Fig. 6 is identical with the unit shown in Figs. 1, 2 and 3 except for the arrangement of the cams and the operating handle. For this reason those parts which are identical with corresponding parts shown in Figs. 1 and 3 are designated by the same reference characters while the modified parts are otherwise identified. Thus, the operating handle is designated 45 and is pivoted on a pin 46 on the valve body in the same manner as shown in Figs. 1, 2 and 3, and has a planar cam surface 47, and a crank arm 48 for engaging the stems of the two valves. When the handle 45 is in neutral or off position it extends substantially at right angles to the major axis of the body member of the unit. The planar cam surface 47 is then disposed close to the stem 23 and substantially at right angles to the axis of the stem while the crank arm is spaced from stem 22. The spring of the pin 46 operates to hold the handle in this neutral position.

Upon depressing the handle 45 into the lowermost dotted position as shown in Fig. 6 the cam surface 47 engages the stem 23 and unseats the valve 15 and when the corner 49 of this cam surface is centered on the stem the operating means will remain in normal flow position maintaining the valve 15 open while the valve 14 is closed.

To effect an emergency or full flow operation of the unit, both valves are opened by raising the handle 45 into the uppermost dotted position shown in Fig. 6 whereupon the corner 50 of cam surface 47 will center on the stem 23 for the valve 15 and maintain said valve open while the crank arm 48 engages the stem 22 and moves it to unseat valve 14. While the handle is held by the operator in this emergency flow position, the two valves are held open and fluid flows from the two outlets 4 and 5 in maximum volume to the part or parts to be serviced. On release of the handle 45 the spring for the valve 14 returns the handle to off position shown in full lines in Fig. 6. This form of my invention differs from the first described form only in that the handle is movable from an intermediate position in which both valves are closed, in either direction and must move through the off position from normal flow to emergency flow position and vice versa, whereas with the handle shown in Figs. 1, 2 and 3 the movement is progressive from the lowermost and off position, first to normal flow and then to emergency flow positions.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a fluid control valve unit, a body member having a pair of valve-receiving bores therein in a parallel adjacent relation to each other, means for intaking fluid under pressure into one of said bores, an intercommunicating port extending through said body member and so positioned that its width bridges the space between said bores at a point intermediate of its ends to afford the passage of pressure fluid from one to the other of said bores, closure means to overlie a side of said body member for closing either of the ends of said intercommunicating port, an outlet port for each bore, valves in said bores for controlling the flow of fluid therefrom into said outlet port, spring means for seating said valves, operating means mounted on said body member for opening said valves, and bolts to cooperate with said closure means whereby two or more identical control valve units thereof may be coupled together with the aforesaid intercommunicating passages thereof in registration with one another.

2. In a flow control valve unit, a body member having a pair of valve-receiving bores extending transversely therethrough in spaced relation to one another, means for intaking fluid under pressure into one of said bores, an intercommunicating port extending transversely through said body member from one outer surface thereof to an opposite outer surface thereof and having between its ends an intermediate portion which bridges the space between said two valve-receiving bores whereby pressure fluid will flow from said one bore to the other bore, outlet ports extending longitudinally in said body member from said bores through opposite outer surfaces of said body member, valves in said bores for controlling the flow of fluid therefrom into said outlet ports, valve operating means mounted on said body member, and closure means mounted on said body for closing the ends of said intercommunicating ports subject to removal to permit of coupling together the body members of at least two of the valve units with the intercommunicating ports thereof in registration with one another.

3. In an assembly of valve units of the kind described, a plurality of valve bodies abutting each other and extending in alignment in one direction, each of said bodies having through it a pair of adjacent parallel bores extending at right angles to the aforesaid direction, an elongated valve structure in each of said bores extending axially of the bore which it occupies, each said valve structure comprising a spring tending to close it, a head at one end which occupies a diametrically enlarged end portion of the bore which contains such valve structure and a stem which carries said head and occupies the opposite end portion of said bore, there being an annular passage around said stem adjacent to said head, and an outlet laterally communicating with said passage, said head controlling admission of fluid to one end of said passage, each of said valve bodies having through it a horizontal intercommunicating port consisting of a bore the width of which spans the space between the aforesaid adjacent enlarged end portions of said valve-containing bores and thereby affords communication between the latter bores, said intercommunicating ports alining with each other to form a passage within the assembled valve units extending in the direction of their alinement, closure means for the opposite ends of said valve-receiving bores, said valve stems projecting slidably through said closure means at one side of each valve body, means operatively related to the projecting portions of said valve stems to operate the valves, inlet means for at least one of said valve bodies communicating with at least one of its said diametrically enlarged bore portions, and closure means for the outer ends of said intercommunicating ports at each end of the assembled valve units.

OTTMAR A. KEHLE.